United States Patent Office 3,583,034
Patented June 8, 1971

---

3,583,034
EXTRUSION HEAD
Roberto Colombo, Turin, Italy, assignor to S.p.A.
Lavorazione Materie Plastiche L.M.P.
Filed Feb. 26, 1969, Ser. No. 802,612
Int. Cl. B29d 23/00
U.S. Cl. 18—14                                   9 Claims

ABSTRACT OF THE DISCLOSURE

Extrusion head of axial type for extruding tubing of thermoplastic material, more particularly a foam tubing, including a head body and a mandrel supported in the body by a spider plate formed with a plurality of radial fins, wherein the mandrel comprises a bulged intermediate section including said spider plate and fins, and wherein one at least of the radially inner and radially outer walls of the passages between the fins comprises a slope which is located in the trailing edge region of the fins thereby to restrict the radial width of said passages in said region.

---

Figure 1:
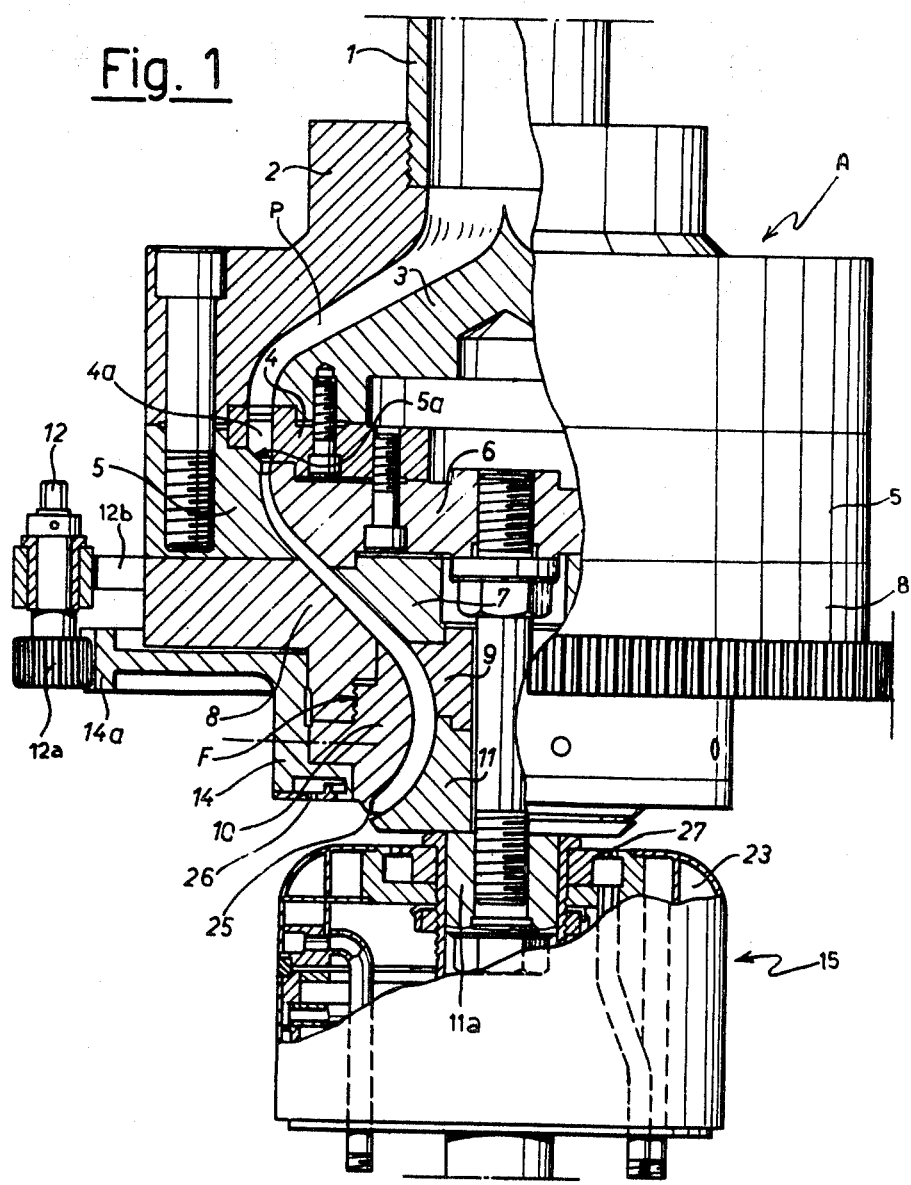

This invention relates to extrusion heads having an annular extrusion passage.

It is known in the art to manufacture a web of a synthetic thermoplastic material by extruding a tubing of said material, blowing or otherwise expanding said tubing just after extrusion, slitting the expanded tubing along a generatrix thereof (or along a pair of diametrically opposite generatrices) and flattening it to a planar form. Also, an extrusion-foaming process has relatively recently been developed, wherein a molten mass of a synthetic thermoplastic material (e.g. polystyrene) having dissolved or dispersed therein a foaming agent is processed under substantial pressure in a screw extruder, and wherein the processed mass is cooled, shortly before extrusion, to incipient solidification temperature of the thermoplastic material; upon extrusion in these conditions, the foaming agent is released in gaseous state within the body of the tubular extrudate because of the decompression of the mass to free atmosphere at the outlet of the extrusion head, so that the mass foams and at the same time solidifies to a degree sufficient to avoid collapse of the foam. The foamed tubing obtained in this manner is subsequently immediately expanded in its diameter and converted to a foamed planar web in the manner depicted hereinbefore.

Two kinds of extrusion heads are used in the art of extruding tubing: (a) cross-heads and (b) axial (or straight-forward) heads. In an axial head the inner mandrel is supported by a spider disk or plate formed with a circular series of radially extending fins; in a cross-head the presence of the spider disk is avoided owing to the curved form of the material-conveying channel in the head.

Experience shows that, by using the above-described process and conventional extrusion heads, it is practically impossible to obtain a foamed planar web having a thickness and/or foam density constant throughout the width of the web. When a cross-head is used, the web thickness and foam density along the width of the web appear to vary from minimum values at a central region of the web to maximum values at the edge regions (or vice-versa), whereas an axial head typically produces a "striped" web composed of longitudinal strips of relatively great thickness alternating with strips of relatively small thickness. Moreover, in both cases it frequently succeeds that the just foamed tubular extrudate tears along a generatrix during diametrical expansion thereof, particularly when a relatively thin foamed web is to be obtained.

This invention provides an improved extrusion head of the axial type, by means of which foamed webs of a surprisingly constant thickness and foam density may be obtained.

According to its broadest aspect, the invention provides an extrusion head for extruding a foamed tubing of a synthetic thermoplastic material, including a head body and a mandrel centrally supported in the body by a spider plate formed with a circular series of radially extending fins, said head being characterized in that the mandrel comprises a bulged intermediate section including said spider plate, and in that one at least of the radially inner and radially outer walls, of the finned region in the head comprises an annular slope which is located in the trailing edge region of the fins thereby to restrict the radial width of the passages between the fins in said edge region.

According to a more specific and advantageous embodiment of the invention, the radially inner wall is of substantially constant diameter, whereas the radially outer wall comprises a section of a substantially constant diameter merging into said annular slope, whereby both the radial width of said passages and their mean diameter are simultaneously restricted in said trailing edge region.

Figure 2:
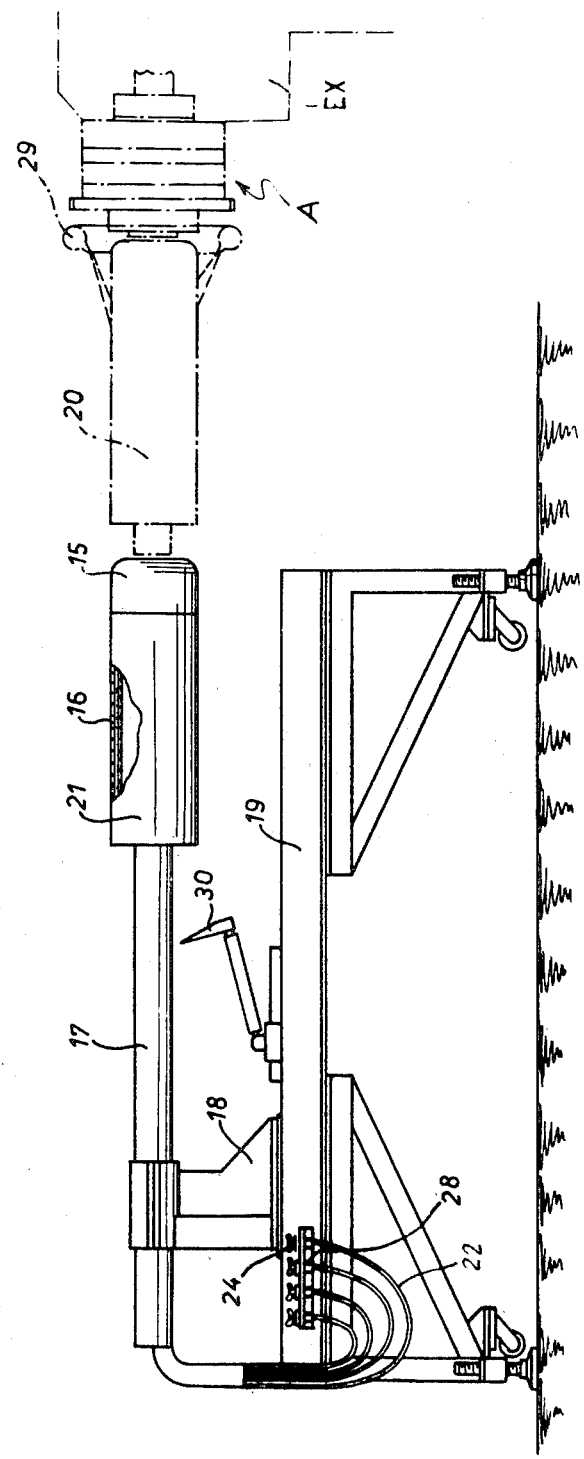
Figure 3:
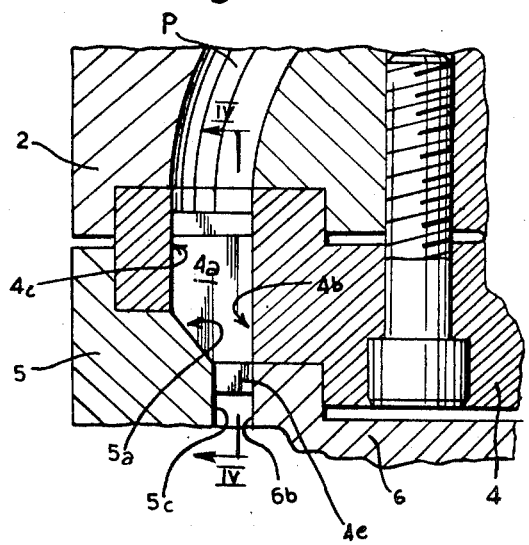
Figure 4:
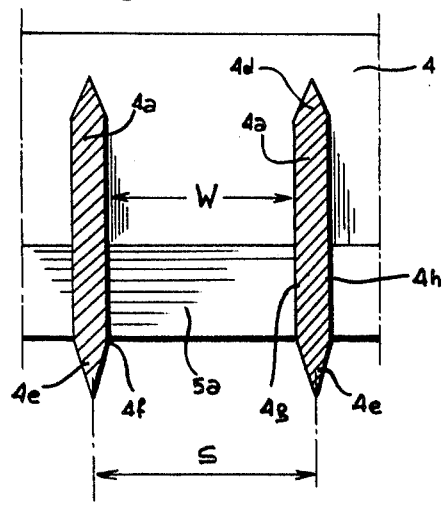

An embodiment of the invention is shown by way of example in the accompanying drawings, wherein:

FIG. 1 is an axial sectional view of the extrusion head;
FIG. 2 is a schematic elevational view showing an arrangement of the head of FIG. 1 in an apparatus for manufacturing a foamed web;
FIG. 3 is an enlarged view of a detail of FIG. 1;
FIG. 4 is a cross-sectional part view on line IV—IV of FIG. 3.

The extrusion head A is designed to receive an extrusion-foamable mass from a screw extruder EX (FIG. 2) through a tubular fitting 1 on which an annular base member 2 of the head is screwed. The body of the head A includes the member 2 and comprises further annular members denoted by 5 and 8, superposed and bolted together in conventional manner. An annular nozzle member 10 is screwed at F into the member 8 and is fast with a ring 14 concentrical therewith, said ring carrying a toothed wheel 14a. A spindle 12 with a pinion 12a is rotatably supported by the annular member 8 by means of a support 12b; the pinion 12a meshes with the wheel 14a, so that, upon rotation of the spindle, the nozzle member 10 may be screwed in or out of the member 8 through a limited extent for the purpose of adjusting the width of the extrusion nozzle 25.

The mandrel of the head is composed of a plurality of coaxially superposed members denoted by 3, 4, 6, 7, 9 and 11, fast with each other. The member 3 is a circular cap of a cuspidal profile and has bolted thereto the member 4, which is a circular spider plate formed with a circular series of fins 4a; the outer circumferential edge of the spider plate 4 is clamped between the members 2 and 5 of the body of the head, so that the mandrel is centrally rigidly supported by the body. It will be seen in FIG. 1 that the mandrel is of a general "pear"-shape and that the spider plate 4 is situated at a location substantially corresponding to the maximum diameter of the mandrel. Thus the body and mandrel of the head jointly define a tubular passage P of circular cross-sectional profile, for the mass to be extruded, the diameter of said passage enlarging progressively towards the region of the fins 4a; in the latter region the passage P is directed substantially axially and subsequently converges conically towards the region of the member 9 of the mandrel and then flares again in the region of the nozzle member 11 of the mandrel, so that the tubular flow of the mass out of the extrusion nozzle 25 flares at an apex angle of about 40° to 60°. Flaring of the flow is assisted by foaming of the mass since foaming increases the volume and, consequently, the diameter of the tubular extrudate.

Diametrical expansion (stretching) of the extrudate is performed by means of a bell 15 carried by a double-walled cylindrical mandrel 16 (FIG. 2), the latter being supported by means of a rod 17 and support 18 which is slidable on a fixed frame 19 towards and away from the extrusion head A. In FIG. 2, numeral 21 denotes the position of the bell and mandrel at the start of the extrusion process, whereas numeral 20 designates the position during extrusion; in the latter position, the bell 15 is kept centered with respect to the head A by engagement with a centering boss 11a projecting from the nozzle member 11. Cooling water is circulated through the double-walled mandrel 16 and water jacket 23 in the bell 15 for cooling from the inside the tubular extrudate. Outer cooling of the extrudate is performed by means of an annular jet of cool air discharged through an annular nozzle 26 fast with the ring 14 (FIG. 1). An additional cooling nozzle 29 (FIG. 2) may be provided to discharge cooling air on the extrudate. A further annular nozzle 27 is formed in the front face of the bell 15 and cool air under pressure is discharged from said nozzle to simultaneously perform three functions: cooling from the inside the just extruded product, stretching the latter by internal pressure and providing a "lubricating" air cushion between the bell 15 and the tubular extrudate sliding thereon. The cooling jackets and nozzles are supplied with water and air, respectively, through flexible pipes 22 from a valve unit 24 designed for an adjustable control of the delivery of the respective fluids. A cutter blade 30 on the frame 19 slits the tubular extrudate longitudinally as the latter is pulled by a winding unit (not shown).

Turning now to the extrusion head, it will be evident to those skilled in the art that its operational conditions radically differ from those prevailing in extrusion of conventional (non-foamed) tubings of synthetic thermoplastic materials, because the foamable material reaching the head from the cylinder of the screw extruder EX has already been uniformly cooled in the last section of the barrel to an exactly controlled extent closely approaching the temperature at which the thermoplastic material changes from its molten, low-viscosity condition to a pasty, high-viscosity condition and is forced in the latter condition through the passage P. The conditions of travel of the material in the passage P are, therefore, extremely critical since any uncontrolled disturbances (of mechanical and/or thermal nature) of the flow in the passage will adversely affect the uniformity of both the thickness and foam density of the extrudate.

It will be seen in FIG. 3 that, in the region of the spider fins 4a, the passage P is defined by cylindrical, radially inner and radially outer walls 4b and 4c, respectively, pertaining to the spider plate 4. It will be also seen in FIG. 1 that the diameter of the said inner wall is substantially greater than the diameter of the annular extrusion nozzle 25. The ratio of the two diameters preferably is from about 1.5:1 to about 2:1; in the embodiment shown, said ratio amounts to about 1.75:1. The number of fins 4a (obviously uniformly distributed about the geometrical axis of the head A) should be as great as practically possible, taking into account the wide circumference available owing to the great diameter of the wall 4b. In numerical terms, at least thirty-six fins should be present, which means that the angular spacing S (FIG. 4) of the fins about the axis of the head must not exceed 10°. Preferably, not less than fourty-eight fins should be adopted; typical heads constructed according to this invention comprise from fifty-four to sixty fins on a circle of a diameter of 20–30 cm.

The fins are identical to each other and comprise each a wedge-shaped leading edge region 4d (turned towards the extruder) and a likewise wedge-shaped trailing edge region 4e, the body of the fin being defined by substantially planar opposed faces 4g, 4h and being flat and comparatively thin as compared with the mutual spacing of the fins (see FIG. 4). The inward cylindrical wall 4b and its continuation 6b on the member 6 (FIG. 3) extend through the whole length (in flow direction) of the fins. Whereas the outward cylindrical wall 4c typically extends along the initial 50%–70% fraction of the fin length and subsequently merges into a frusto-conical slope 5a on the member 5 converging towards the inward wall, thereby reducing both the radial width and mean diameter of the passage P in the region of the trailing edges of the fins. The amount of the radial width reduction depends upon the material to be processed and typically is from about 40% to about 60%. The slope 5a terminates at the root 4f (FIG. 4) of the wedge-profile of the trailing edges 4e of the fins and is followed by a cylindrical wall zone 5c (FIG. 3) on the member 5, the trailing edges 4e protruding into the gap between said zone 5c and the corresponding zone 6b on the member 6. It is to be understood, however, that the slope 5a may be designed to extend down throughout the whole length of the wedge-profile of the trailing edges, the function of the slope consisting in compressing the material at the outlet of the passages between the fins so as to fuse the 36–60 individual streams of the material to a single annular stream. The structure shown in FIG. 3, wherein the slope extends to the root only, of the wedge-shaped trailing edges 4e, is preferred because (apparently at least) it induces in the material leaving the edges a small degree of turbulence, so that the lateral sides of the adjacent streams "weld" better with each other. The degree and effectiveness of said turbulence appears to markingly increase when the width W (FIG. 4) of the passages between the fins assumes a sufficiently small value, that is, when the number of fins is sufficiently high. It is advantageous to adopt a width W not exceeding about 1 cm. (as measured on the circumference of the inner wall 4b), the thickness of the fins being as small as is practically compatible with their overall mechanical strength necessary to rigidly support the mandrel of the head in extrusion conditions.

I claim:

1. Extrusion head of axial type for extruding a tubular product of a synthetic thermoplastic foam, including a head body and a mandrel supported in the body by a spider plate formed with a plurality of uniformly spaced radial fins, wherein the mandrel comprises a bulged intermediate section including said spider plate, and wherein one at least of the radially inner and radially outer walls of the finned region in the head comprises an annular slope which is located in the trailing edge region of the fins thereby to restrict the radial width of the passages between the fins in said edge region.

2. Extrusion head of axial type for extruding a tubular product of a synthetic thermoplastic foam, including a head body and a mandrel supported in the body by a spider plate formed with a plurality of uniformly spaced radial fins, wherein the mandrel comprises a bulged intermediate section including said spider plate, and wherein one at least of the radially inner and radially outer walls of the finned region in the head comprises an annular slope which is located in the trailing edge region of the fins thereby to restrict the radial width of the passages between the fins in said edge region, said fins being spaced therebetween through an angle not exceeding 10°.

3. Extrusion head of axial type for extruding a tubular product of a synthetic thermoplastic foam, including a head body and a mandrel supported in the body by a spider plate formed with a plurality of uniformly spaced radial fins, wherein the mandrel comprises a bulged intermediate section including said spider plate, and wherein one at least of the radially inner and radially outer walls of the finned region in the head comprises an annular slope which is located in the trailing edge region of the fins thereby to restrict the radial width of the passages between the fins in said edge region, said fins being spaced therebetween through an angle not exceeding 10° and said slope restricting said radial width by 40% to 60%.

4. Extrusion head of axial type for extruding a tubular product of a synthetic thermoplastic foam, including a head body and a mandrel supported in the body by a spider plate formed with a plurality of uniformly spaced radial fins, wherein the mandrel comprises a bulged intermediate section establishing a maximum diameter of the mandrel and including said spider plate, and wherein the radially outer wall of the finned region in the head comprises an annular slope which is located in the trailing edge region of the fins thereby to restrict the radial width of the passages between the fins in said edge region.

5. Extrusion head of axial type for extruding a tubular product of a synthetic thermoplastic foam, including a head body and a mandrel supported in the body by a spider plate formed with a plurality of uniformly spaced radial fins, wherein the mandrel comprises a bulged intermediate section establishing a maximum diameter of the mandrel and including said spider plate, and wherein the radially outer wall of the finned region in the head comprises an annular slope which is located in the trailing edge region of the fins and restricts the radial width of the passages between the fins in said edge region by 40–60%, the mutual angular spacing of said fins not exceeding 10°.

6. Extrusion head of axial type for extruding a tubular product of a synthetic thermoplastic foam, including a head body and a mandrel supported in the body by a spider plate formed with a plurality of uniformly spaced radial fins, wherein:
   (i) the mandrel comprises a bulged intermediate section establishing a maximum diameter of the mandrel and including said spider plate,
   (ii) the radially inner wall of the finned region in the head is substantially cylindrical,
   (iii) the radially outer wall in said finned region includes an annular slope which is located in the trailing edge region of the fins to restrict the radial width of the passages between the fins in said edge region,
   (iv) said fins being at least forty-eight in number.

7. Extrusion head of axial type for extruding a tubular product of a synthetic thermoplastic foam, including a head body and a mandrel supported in the body by a spider plate formed with a plurality of uniformly spaced radial fins, wherein:
   (i) the mandrel comprises a bulged intermediate section establishing a maximum diameter of the mandrel and including said spider plate,
   (ii) the radially inner wall of the finned region in the head is substantially cylindrical,
   (iii) the radially outer wall in said finned region includes an annular slope which is located in the trailing edge region of the fins to restrict the radial width of the passages between the fins in said edge region, by 40–60%,
   (iv) said fins being uniformly mutually spaced through a distance not exceeding 1 cm. as measured on the circumference of the said radially inner wall.

8. Extrusion head of axial type for extruding a tubular product of a synthetic themoplastic foam, including a head body and a mandrel supported in the body by a spider plate formed with a plurality of uniformly spaced radial fins, wherein:
   (i) the mandrel comprises a bulged intermediate section establishing a maximum diameter of the mandrel and including said spider plate,
   (ii) the radially inner wall of the finned region in the head is substantially cylindrical,
   (iii) the radially outer wall in said finned region includes an annular slope which is located in the trailing edge region of the fins to restrict the radial width of the passages between the fins in said edge region,
   (iv) each of said fins comprising a flat body defined by a pair of substantially planar opposed faces and terminating by a pair of wedge-shaped portions defining the leading- and trailing edges,
   (v) said fins being mutually spaced through a distance not exceeding 1 cm. as measured on the circumference of said radially inner wall.

9. Extrusion head of claim 8, wherein the wedge-shaped portions defining the trailing edges of the fins protrude axially beyond the said slope.

References Cited
UNITED STATES PATENTS

| | | | |
|---|---|---|---|
| 2,177,633 | 10/1939 | Blackard | 18—14(C)X |
| 2,503,230 | 4/1950 | Dyer | 18—14(G)X |
| 3,281,897 | 11/1966 | Mercer | 18—12(N)X |
| 3,391,051 | 7/1968 | Ehrenfreund | 18—14(S)X |

J. SPENCER OVERHOLSER, Primary Examiner

N. E. LEHRER, Assistant Examiner

UNITED STATES PATENT OFFICE
CERTIFICATE OF CORRECTION

Patent No. 3,583,034          Dated June 8, 1971

Inventor(s) Roberto Colombo

It is certified that error appears in the above-identified patent and that said Letters Patent are hereby corrected as shown below:

In the heading of the application add:

-- Claims priority, application Italy, March 4, 1968, 50767-A/68 --

Signed and sealed this 11th day of January 1972.

(SEAL)
Attest:

EDWARD M. FLETCHER, JR.
Attesting Officer

ROBERT GOTTSCHALK
Acting Commissioner of Patents